Oct. 30, 1962 W. P. KRUSE 3,061,668

TELEVISION SIGNAL ANALYZER

Filed Sept. 9, 1960

INVENTOR.
William Paul Kruse
BY Mueller & Aichele
Attys.

3,061,668
TELEVISION SIGNAL ANALYZER
William Paul Kruse, Quincy, Ill., assignor to Gates Radio Company, Quincy, Ill., a corporation of Illinois
Filed Sept. 9, 1960, Ser. No. 54,963
8 Claims. (Cl. 178—6)

This invention relates generally to television test equipment and in particularly to a method for analyzing the transmitted television video signal during normal program transmission.

In providing for transmission of video television signals, it is generally necessary that a band width be provided which has four megacycles on either side of the carrier. However, such an eight megacycle band width is undesirable because of the channel width required and it is therefore desirable that only one side band be transmitted. Difficulty has been encountered in completely removing the undesired side band and as a compromise arrangement practically all of one side band is removed thus leaving the remaining side band unaffected. This method is known as vestigial-side band transmission and is the approved method of television transmission at the present time. However, facilities have not been available to analyze or monitor the transmittted video signal during normal programming to determine the accuracy of the transmitted signal.

Testing of video transmitters has therefore been confined to off-the-air periods because testing during normal program transmission has presented many problems which have not been easily overcome. Testing of the video transmitter during off-the-air periods has the disadvantage of not giving a true indication of the operation of the transmitter during actual programming. Monitoring of the video signal at the present time has been confined to an image reproduction on a cathode ray viewing tube connected to a video amplifier stage.

Generally, poor frequency response of the video signal is manifested at the higher frequencies by less fine detail in the cathode ray tube of the television receiver. Fine detail is not easily visible and even if placed on the screen of the cathode ray tube of the television receiver, the fine detail would be lost to many observers of the tube. Therefore, the optimum method for analyzing the frequency response of a transmitter is to analyze the transmitter response during normal program transmission.

Thus, it is an object of the present invention to provide an improved system for displaying the video frequency response of a television transmitter.

Another object of the present invention is to provide a method for analyzing a transmitted video television signal during normal program transmission.

A further object of the invention is to provide a system for displaying on an oscilloscope the variation of the RF spectrum of a television transmitter from the applied video spectrum during normal program transmission.

A feature of the invention is the provision of a system including synchronous detector circuits and low pass filters which produce the RF spectrum of a television transmitter and the video spectrum of the input signal which are combined in a differential amplifier and displayed on an oscilloscope to show errors in the vestigial sideband response of a video television transmitter.

Another feature of the invention is the provision of a system including a double sideband modulator fed with input video and an unmodulated carrier from a television transmitter to produce a wide band, double side band signal which is compared with the transmitted signal from the television transmitter in a differential amplifier and applied to an oscilloscope for displaying the vestigial sideband response.

In practicing the invention, a system for analyzing and displaying the signal from a television transmitter is provided. An R.F. oscillator which sweeps equally above and below the television transmitter carrier frequency is fed to a first synchronous detector. A sample of the video transmitter output also is fed to the first synchronous detector and the output of the detector is fed to a first low pass filter, the output of which is an R.F. spectrum suitable for display. The same R.F. oscillator output is applied to the unmodulated TV carrier in a balanced modulator to produce a video sweep. The video sweep and the input video are applied to a second synchronous detector and the output is fed to a second low pass filter having an output which produces a video spectrum suitable for display. The R.F. spectrum and the video spectrum are combined in a narrow band differential amplifier the output of which is fed to an oscilloscope which produces a display of the vestigial sideband frequency response during normal program transmission. Intensity markers are applied to the oscilloscope for frequency reference. The oscilloscope may be blanked at frequencies where the video spectrum has insufficient amplitude so that improper display is not produced.

In an alternate embodiment of the invention, the video spectrum is produced by a double sideband modulator to which the input video and the unmodulated carrier are applied to produce a wide band double sideband signal. This signal is mixed with the sweep from the R.F. oscillator in a second synchronous detector and fed through a low pass filter to provide the video spectrum.

Figure 1:
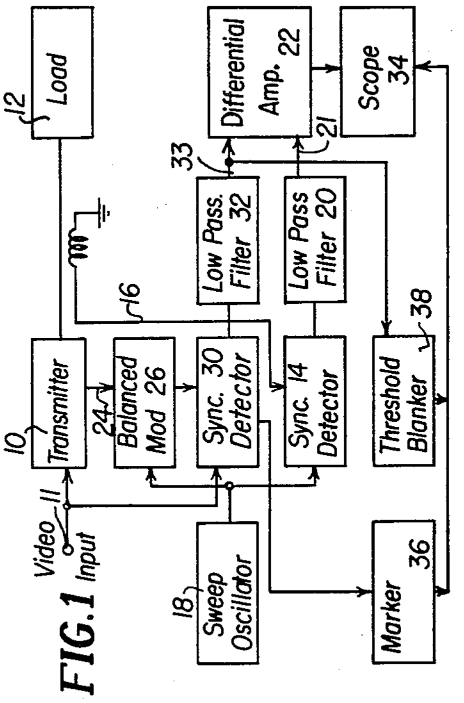
FIG. 1 is a block diagram of one embodiment of the invention.

Referring now to the drawing, FIG. 1 is a block diagram of one embodiment of the invention. A television vestigial sideband transmitter 10 of the type generally used is coupled to a load 12 which may be an antenna. A video signal from terminal 11 is applied to transmitter 10 to amplitude modulate the carrier wave produced therein. A sample of the output from the transmitter is applied through lead 16 to synchronous detector 14. The output from R.F. sweep oscillator 18 which has an equal sweep above and below the video transmitter frequency is also fed to synchronous detector 14. The output of synchronous detector 14 is fed to a low pass filter 20 which may remove the R.F. components. The output of the low pass filter 20 produces an R.F. spectrum at point 21 which is suitable for display.

The output of R.F. sweep oscillator 18 also is mixed with the unmodulated TV carrier from the transmitter 10, which is derived from lead 24, in a balanced modulator 26 to produce a video sweep signal. The video sweep signal and the video input from terminal 11 are applied to a second synchronous detector 30, and the output is fed to a second low pass filter 32 which may remove the R.F. components. The output of filter 32 produces a video spectrum at point 33 which is suitable for display.

The R.F. spectrum and the video spectrum from points 21 and 33 are combined in the narrow band differential amplifier 22. Differential amplifier 22 should possess large dynamic balance range. The output of amplifier 22 may be fed to oscilloscope 34. Oscilloscope 34 produces a display of the vestigial sideband frequency response. When the output of the transmitter corresponds accurately to the video input signal, the oscilloscope will sweep along the zero line. When there is a difference, the display will show the region in which the error occurs. The display does not require special video test signals for operation. High resolution-wideband video signals from normal television programming may be used to provide the operation.

Since the usual television program material does not always contain important Fourier components from zero to 4 megacycles, it may be desirable to blank the scope trace during portions of the video spectrum having insufficient amplitude for reliable operation. The video spectrum is applied to threshold blanker 38 which produces a voltage to blank those portions of the scope trace where the video spectrum falls below a predetermined value. In order to better identify the various frequency regions of the response displayed on the scope, marker unit 36 is provided to produce from the video spectrum signals providing frequency reference on an oscilloscope 34.

Figure 2:
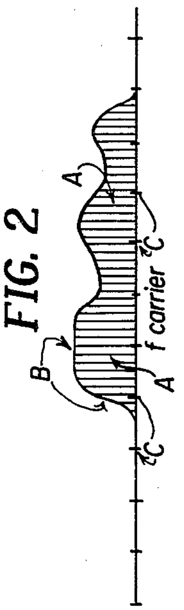
FIG. 2 is a typical R.F. spectrum display.
Figure 3:
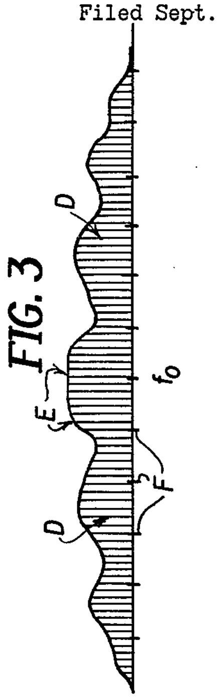
FIG. 3 is a typical video spectrum display.

FIG. 2 shows a typical R.F. spectrum display signal which is taken from point 21 of FIG. 1. The amplitude modulated carrier wave was synchronously detected. The lines A are the Fourier series components, the line B shows the outline of the spectrum display (shown for illustrative purposes only), and marks C are the frequency markers from unit 36. FIG. 3 is a typical video spectrum display taken from point 33 of FIG. 1. The video signal was also synchronously detected. The lines D are the Fourier series components, the line E shows the outline of the spectrum display (shown for illustrative purposes only), and marks F are the frequency markers from unit 36. If the television video transmitter is operating properly, outline B showing the response of the television transmitter, and outline E showing the response of the video signal, should be identical within the passband of the transmitter.

Figure 4:
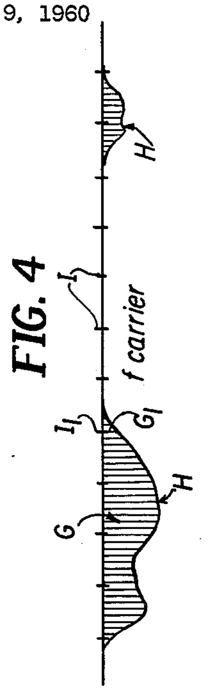
FIG. 4 is an oscilloscope display showing the video response of a transmitted television signal.

FIG. 4 shows the display on the oscilloscope 34 of FIG. 1 wherein the R.F. spectrum of FIG. 2 and the video spectrum of FIG. 3 are differentially combined. Lines G are the Fourier series components and trace outline H shows the vestigial sideband response. Under optimum conditions, the outline H will sweep across the zero vertical position of the scope in the desired passband. Frequency markers I are applied to the oscilloscope 34 from marker unit 36 of FIG. 1 so that the particular frequency of unfaithful reproduction of the video signal when modulated on the R.F. carrier wave may be noted. For example, if frequency reference marker $I_1$ represents 1 mc., and a response $G_1$ appears at this marker, this will indicate that improper modulation is occurring for Fourier components of 1 mc.

Figure 5:
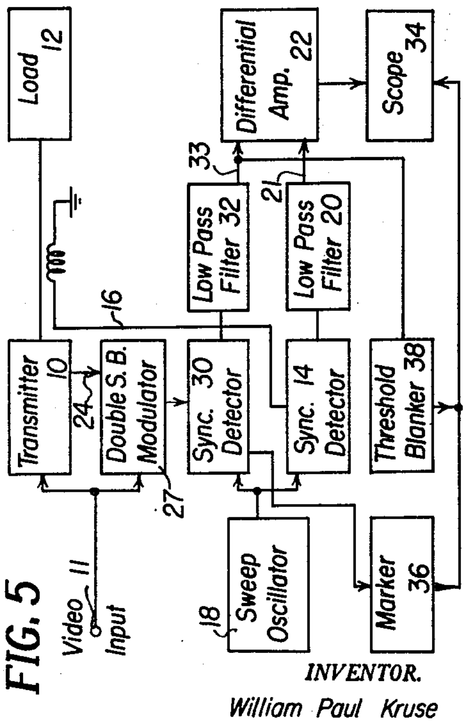
FIG. 5 is a block diagram of another embodiment of the invention.

FIG. 5 is a block diagram of an alternate embodiment of the invention. As in FIG. 1, a television vestigial sideband transmitter 10 is coupled to a load 12 which may be an antenna. A video signal from terminal 11 is applied to transmitter 10 to amplitude modulate the carrier wave produced therein. A sample of the transmitter output is applied through lead 16 to synchronous detector 14. The output from R.F. sweep oscillator 18 is also fed to synchronous detector 14. The R.F. sweep oscillator 18 is of the same type as the R.F. sweep oscillator of FIG. 1. The output of synchronous detector 14 is fed to a low pass filter 20 which may remove the R.F. components. The output of the low pass filter 20 produces an R.F. spectrum at point 21 which is suitable for display.

A double sideband modulator 27 has applied thereto a signal from video input 11 and the unmodulated carrier signal from transmitter 10. The output of double sideband modulator 27 is a wideband double sideband signal which is applied to synchronous detector 30. The output from the R.F. sweep oscillator 18 is also applied to synchronous detector 30, the output of which is applied to low pass filter 32 which may remove the R.F. components. The output of filter 32 produces a video spectrum which is suitable for display.

The R.F. spectrum and the video spectrum are combined in a narrow band differential amplifier 22 as in FIG. 1 and the output of differential amplifier 22 may be fed to oscilloscope 34 where a display of the vestigial sideband frequency response is produced. The operation of the scope 34 is the same as in FIG. 1 with the video spectrum being applied to threshold blanker 38 to blank portions of the scope trace where the video spectrum falls below a predetermined value. Marker 36 provides signals from the video spectrum for frequency reference on scope 34.

Thus, the invention provides a simple and effective means for displaying and analyzing the frequency response of a television video transmitter during normal programming. The invention may also provide a display of the video input signal spectrum or the R.F. spectrum of the transmitter.

I claim:

1. A system for monitoring the frequency response of a television video transmitter wherein a radio frequency carrier wave is amplitude modulated by a video signal producing a vestigial side band modulated wave during normal program transmission, said system including in combination, first means providing a signal having components representing the frequency spectrum of the video signal, second means providing a signal having components representing the frequency spectrum of the modulated radio frequency carrier wave, and differential amplifier means coupled to said first means and to said second means for comparing the amplitude of the signal representing the frequency spectrum of the modulated radio frequency carrier wave with the amplitude of the signal representing the frequency spectrum of the video signal.

2. A system for monitoring the frequency response of a television video transmitter wherein a radio frequency carrier wave is amplitude modulated by a video signal producing a vestigial side band modulated wave during normal program transmission, said system including in combination, first means providing a first signal representing the frequency spectrum of the video signal, second means coupled to said first means for providing a blanking voltage when the first signal falls below a predetermined value, third means providing a second signal representing the frequency spectrum of the modulated radio frequency carrier wave, differential amplifier means coupled to said first and third means for comparing the first and second signals, and an oscilloscope coupled to said differential amplifier means and to said second means for providing a display of the frequency response of the vestigial side band of said television video transmitter, said second means providing blanking the portion of the display on said oscilloscope where the frequency spectrum of the video signal falls below a predetermined value.

3. A system for displaying the vestigial side band frequency response during normal program transmission of a television transmitter which produces a filtered carrier wave and which amplitude modulates the same by a video signal to provide a vestigial side band wave, said system including in combination, sweep oscillator means, first synchronous detector means coupled to said oscillator means, means applying the modulated wave from the transmitter to said first synchronous detector means whereby said detector means provides a signal representing the frequency spectrum of the transmitted wave, video spectrum means coupled to said sweep oscillator means including modulator means and second synchronous detector means coupled thereto, means applying the unmodulated carrier wave from the television transmitter to said modulator means, means applying the video signal to said video spectrum means for producing a signal representing the frequency spectrum of the video signal, differential amplifier means, means applying said signals representing the frequency spectrums of the transmitted wave and of the video signal to said differential amplifier means whereby said differential amplifier means provides a signal representing variations of the transmitted wave from the video signal and an oscilloscope coupled to said differential amplifier means for displaying the vestigial side band response of the output of said television transmitter.

4. A system for displaying the vestigial side band frequency response during normal program transmission of a television transmitter which produces a filtered carrier wave and which amplitude modulates the same by a video signal to provide a vestigial side band wave, said system including in combination, sweep oscillator means, first synchronous detector means coupled to said oscillator means, means applying the modulated wave from the transmitter to said first synchronous detector means whereby said detector means provides a signal representing the frequency spectrum of the transmitted wave, video spectrum means coupled to said sweep oscillator means including modulator means and second synchronous detector means coupled thereto, blanking means coupled to said video spectrum means for providing a blanking voltage, means applying the unmodulated carrier wave from the television transmitter to said modulator means, means applying the video signal to said video spectrum means for producing a signal representing the frequency spectrum of the video signal, differential amplifier means, means applying said signals representing the frequency spectrums of the transmitted wave and of the video signal to said differential amplifier means whereby said differential amplifier means provides a signal representing variations of the transmitted wave from the video signal, and an oscilloscope coupled to said differential amplifier means and to said blanking means for displaying the vestigial side band response of the output of said television transmitter, said blanking means causing portions of the display of said oscilloscope to be blanked where the frequency spectrum of the video signal is below a predetermined value.

5. A system for displaying on display means the vestigial side band frequency response during normal program transmission of a television transmitter which produces a filtered carrier wave which amplitude modulates the same by a video signal to provide a vestigial side band wave, said system including in combination, sweep oscillator means, first synchronous detector means coupled to said oscillator means, means applying the modulated wave from the transmitter to said first synchronous detector means whereby said detector means provides a signal representing the frequency spectrum of the transmitted wave, video spectrum means coupled to said sweep oscillator means including modulator means and second synchronous detector means coupled thereto, means applying the unmodulated carrier wave from the television transmitter to said modulator means, means applying the video signal to said video spectrum means for producing a signal representing the frequency spectrum of the video signal, blanking means coupled to said video spectrum means for providing a blanking voltage for frequencies at which the components of the video signal falls below a predetermined value, marker means coupled to said second synchronous detector means for providing frequency references for the frequency spectrum of the video signal, differential amplifier means, means applying said signals representing the frequency spectrums of the transmitted wave and of the video signal to said differential amplifier means whereby said differential amplifier means provides a signal to the display means representing variations of the spectrum of the transmitted wave from the spectrum of the video signal, said blanking means and said marker means being coupled to the display means for blanking the same at frequencies at which the video signal falls below a particular value and for providing frequency reference markers thereon.

6. A system for displaying the vestigial side band frequency response during normal program transmission of a television transmitter which produces a filtered carrier wave and which amplitude modulates the same by a video signal to provide a vestigial side band wave, said system including in combination, sweep oscillator means providing a radio frequency signal, first synchronous detector means coupled to said oscillator means, means applying the modulated wave from the transmitter to said first synchronous detector means whereby said detector means provides a signal representing the frequency spectrum of the transmitted wave, modulator means coupled to said sweep oscillator means, means applying the unmodulated carrier wave from the television transmitter to said modulator means to produce a video sweep signal, second synchronous detector means, means applying the video sweep signal and the video signal to said second synchronous detector means for producing a signal representing the frequency spectrum of the video signal, differential amplifier means, means applying said signals representing the frequency spectrums of the transmitted wave and of the video signal to said differential amplifier means whereby said differential amplifier means provides a signal representing variations of the transmitted wave from the video signal, and an oscilloscope coupled to said differential amplifier means for displaying the vestigial side band response of the output of said television transmitter.

7. A system for displaying the vestigial side band frequency response during normal program transmission of a television transmitter which produces a filtered carrier wave and which amplitude modulates the same by a video signal to provide a vestigial side band wave, said system including in combination, sweep oscillator means, first synchronous detector means coupled to said oscillator means, means applying the modulated wave from the transmitter to said first synchronous detector means whereby said detector means provides a signal representing the frequency spectrum of the transmitted wave, double side band modulator means, means applying the video signal and the unmodulated carrier wave from the television transmitter to said modulator means to provide a double side band signal, second synchronous detector means coupled to said sweep oscillator means and to said modulator means for producing a signal representing the frequency spectrum of the video signal, differential amplifier means, means applying said signals representing the frequency spectrums of the transmitted wave and of the video signal to said differential amplifier means whereby said differential amplifier means provides a signal representing variations of the transmitted wave from the video signal, and an oscilloscope coupled to said differential amplifier means for displaying variations in the vestigial side band response of said television transmitter.

8. A system for displaying on display means the vestigial side band frequency response during normal program transmission of a television transmitter which produces a filtered carrier wave and which amplitude modulates the same by a video signal to provide a vestigial side band wave, said system including in combination, sweep oscillator means, first synchronous detector means coupled to said oscillator means, means applying the modulated waves from the transmitter to said first synchronous detector means whereby said detector means provides a signal representing the frequency spectrum of the transmitted wave, modulator means, means applying the unmodulated carrier wave from the television transmitter and the video signal to said modulator means, second synchronous detector means coupled to said sweep oscillator means and to said modulator means for producing a signal representing the frequency spectrum of the video signal, blanking means coupled to said second synchronous detector means for providing a blanking voltage when frequency components of the video signal fall below a predetermined value, marker means coupled to said second synchronous detector means for providing frequency reference signals at various frequencies, differential amplifier means, means applying said signals representing the frequency spectrums of the transmitted wave and of the video signal to said differential amplifier means whereby said differential amplifier means provides a signal to the display means representing variations of the transmitted wave from the video signal, said blanking means and said marker means being coupled to the display means for blanking the display at frequencies at which the video signal component falls below a predetermined value and providing frequency reference means for the frequency spectrum of the video signal.

References Cited in the file of this patent

UNITED STATES PATENTS

| | | |
|---|---|---|
| 2,504,852 | Lewis | Apr. 18, 1950 |
| 2,646,461 | Grace | July 21, 1953 |
| 2,751,554 | Schlesinger | June 19, 1956 |
| 2,782,380 | Coate | Feb. 19, 1957 |
| 2,794,952 | Golden | June 4, 1957 |
| 2,808,564 | Brandt | Oct. 1, 1957 |
| 2,885,470 | Bartelink | May 5, 1959 |
| 2,952,770 | Downie | Sept. 13, 1960 |